(12) United States Patent
Gehrig et al.

(10) Patent No.: US 7,575,210 B2
(45) Date of Patent: Aug. 18, 2009

(54) DEVICE FOR SUSPENDING LENSES INTENDED MORE PARTICULARLY TO OPTICAL LENSES PROCESSING

(75) Inventors: Jean Gehrig, Viry (FR); Denis Gehrig, Saint-Julien (FR)

(73) Assignee: Special Coating Laboratory International, Archamps (FR)

( * ) Notice: Subject to any disclaimer, the term of this patent is extended or adjusted under 35 U.S.C. 154(b) by 1170 days.

(21) Appl. No.: 10/735,233

(22) Filed: Dec. 12, 2003

(65) Prior Publication Data
US 2008/0029466 A1 Feb. 7, 2008

(30) Foreign Application Priority Data
Dec. 13, 2002 (EP) .................. 02027942

(51) Int. Cl.
A47B 96/06 (2006.01)
A44B 21/00 (2006.01)
(52) U.S. Cl. .................. 248/229.16; 24/3.3; 248/227.4; 248/902
(58) Field of Classification Search .................. 248/902, 248/229.16, 230.1, 230.7, 214, 215, 227.4, 248/229.26, 231.81, 339, 340; 224/246, 224/666; 24/3.3, 3.4, 338, 3.1, 8; 211/41.14
See application file for complete search history.

(56) References Cited

U.S. PATENT DOCUMENTS 2,884,219 A * 4/1959 Glover .................. 248/305
5,372,345 A * 12/1994 Schmidt .................. 248/229.16
5,491,878 A * 2/1996 Janouschek .................. 24/3.3
5,511,705 A * 4/1996 Dreszer .................. 224/666
5,794,312 A * 8/1998 O'Mahony .................. 24/3.3
5,864,924 A * 2/1999 Rodriguez .................. 24/3.3
5,988,191 A 11/1999 Duncan
6,330,962 B1 * 12/2001 Rodriguez .................. 224/246
2008/0029466 A1 * 2/2008 Gehrig et al. .................. 211/41.14

FOREIGN PATENT DOCUMENTS

| DE | 9001964 | 4/1990 |
| DE | 4418950 | 12/1995 |
| EP | 0215261 | 3/1987 |
| EP | 0483034 | 4/1992 |

* cited by examiner

*Primary Examiner*—J. Allen Shriver
*Assistant Examiner*—Tan Le
(74) *Attorney, Agent, or Firm*—The Weintraub Group, PLC

(57) ABSTRACT

A glass holder device for treatment of optical glasses (4, 4') or other substrates horizontally supports an elongated bar (1) with evenly spaced notches (10) on a frame and suspends glass holder grips (2) in parallel side-by-side vertical relation. The glass holder grip (2) comprises an axially elongated rod (20), that forms the body of the grip, and holding means (3, 31, 31') connected to the grip body (20) for clutching the outer periphery (40, 40') of the optical glass (4, 4') and holding the glass generally parallel with the lower end portion of and adjacent to a stop (36) bent outwardly from the body (20) for supporting the glass. The upper end portion of the rod (20) includes hanging means (21, 22, 25) for removably connecting the grip to the bar (1) and locking means (11, 23, 12, 25) for preventing free rotation of the grip (2) around the bar (1).

6 Claims, 2 Drawing Sheets

DEVICE FOR SUSPENDING LENSES INTENDED MORE PARTICULARLY TO OPTICAL LENSES PROCESSING

CROSS-REFERENCE TO RELATED APPLICATIONS

This Application claims priority to European Patent Application No. EP 02027942.8 which was filed on Dec. 13, 2002, the disclosure of which is hereby specifically incorporated herein by reference.

BACKGROUND OF THE INVENTION

1. Field of the Invention

The purpose of this invention is a glass holder device, which is particularly intended to the treatment of optical glass lenses or other substrates.

2. Description of the Prior Art

In the area of optical glass lenses treatment, assisted by glass holder devices, optical glass is subjected to various cleaning treatments and/or of liquid application. The aforementioned glass holder devices consist of a frame provided with at least a horizontal bar and metal grips suspended one behind the other to the aforementioned bar and steadily welded to the latter in prevention of the falling of the grips, especially during the device transportation or while performing this treatment. Each grip carries an optical glass lens which is maintained on the aforementioned grip, in position appreciably parallel to the axis of the metal rod forming the body of the grip, by means of two lever-arms flexibly recalled one towards the other and clutching and tightening the aforementioned glass lens between their two free ends by pinching its peripheral edge and a stop on which the aforementioned glass rests.

The control operations of optical glasses are carried out by removing the aforementioned glasses directly from the glass holder grips with the fingers which causes scratching of the aforementioned glasses or leaving finger prints which will be built up on the glass especially during its polymerization.

Besides the fact of their monolithic configuration, existing glass holder devices show a significant blocking volume, which does not allow reduced volume storage. Otherwise, the existing glass holder grips are not adapted to receiving optical glass of varied sizes and particularly thick or very thin glass.

BRIEF SUMMARY OF THE INVENTION

The goal of this invention is to remedy these disadvantages by offering a universal glass holder device which makes possible dismounting the glass holder grips easily while ensuring their blocking in free rotation around the bar of the frame in the suspension position.

According to this invention, the glass holder device is particularly intended for optical glass treatment or other substrates and includes a frame and a horizontal bar of cylindrical shape supported on the frame and supporting glass holder grips and is characterized in that the glass holder grip comprises an axially elongated center rod forming the body of the grip and having at an upper end portion thereof hanging means for removably suspending the glass holder grip to the aforementioned bar, one next to the other on evenly spaced positions and locking means for preventing free rotation of the aforementioned grip around the bar, and at a lower end portion thereof a stop for positioning the optical glass on the aforementioned grip, the aforementioned optical glass being maintained substantially parallel to the axis of the center rod.

The hanging means includes the center rod of the glass holder grip being bent at the upper end portion thereof in a manner to form an inverted downwardly open U-shaped hook for allowing the grip to be suspended from the bar of the frame by ratcheting the hook in a notch cut into the aforementioned bar. The hook includes two branches and a space to receive the bar, which will be clutched by the two branches. The locking means includes the bottom of the notch including a rectilinear surface and one branch, adapted to be received in the notch, including a rectilinear surface that engages the bottom surface of the notch, wherein engagement between the rectilinear surfaces prevents the glass holder grip from turning freely around the bar.

A holder for clutching and tightly gripping the outer periphery of an optical glass is mounted to the rod, the glass holder being V-shaped and comprising two lever arms and an apex with the apex mounted to the center rod and assembled around a common swivel axis, the lever arms having free ends flexibly recalled one towards the other to clutch and to tighten the glass between their free ends by pinching its peripheral edge. A lower and portion of the rod is bent at right angles to form the stop and the aforementioned optical glass rests upon the stop extending perpendicularly from the center rod of the grip.

In a preferred method of implementation the lever arms will be provided at their free end with a contact piece in the shape of blade, contained on its edge which is intended to be in contact with the peripheral edge of the glass in a round and curved cut defined by two points. The lever arms, by preference, will be implemented only in one part starting from the folded metal rod.

BRIEF DESCRIPTION OF THE DRAWINGS

The advantages and characteristics of this invention will stand out more clearly from the description and the attached drawings, which represent a non-restrictive method of its implementation.

DETAILED DESCRIPTION OF THE PREFERRED EMBODIMENT

Figure 1:
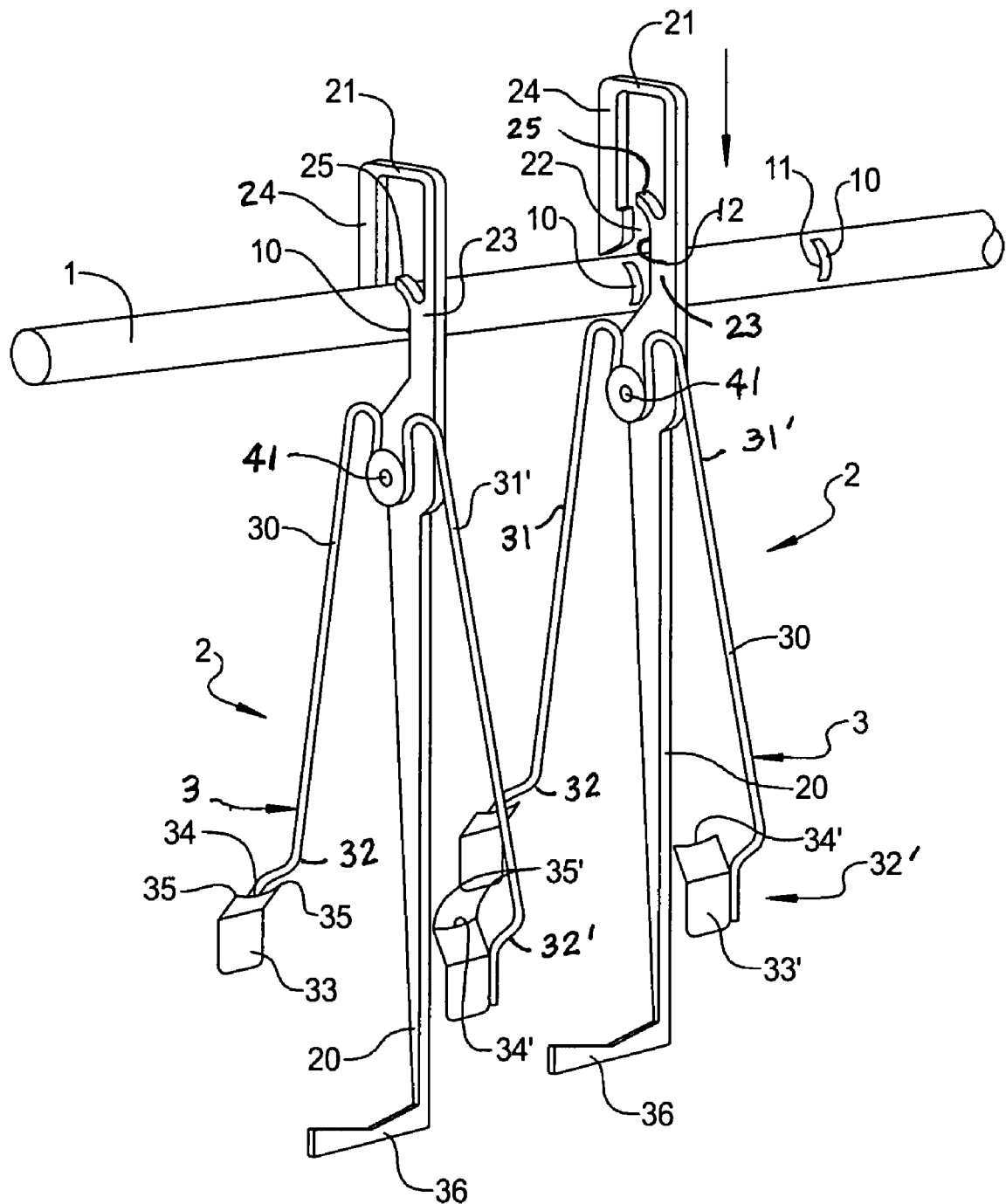
FIG. 1 is a perspective partial view of two glass holder devices positioned relative to a horizontally disposed cylindrical bar, in accordance with this invention, with one and the other of the holder devices, respectively, being shown removably connected to and in position for connection to the bar.

Referring to the drawings, and in particular to FIG. 1, according to this invention, a glass holder device 100 comprises an axially elongated cylindrical bar 1 for suspending glass holder grips 2. The bar 1 is disposed horizontally and adapted to be supported on a frame (not shown). A series of evenly spaced notches 10 are cut in the bar 1. The glass holder grips 2 are joined to the bar on the positions marked by the notches 10 and evenly spaced along the bar 1 in vertical side-by-side relation.

The glass holder grips 2 are configured to hold an optical glass 4, 4' (see FIG. 2) or another substrate in a protective manner to obviate damage while subjected to various cleaning treatments or liquid application.

A glass holder grip 2 comprises an axially elongated metal center rod 20, forming the body of the grip and having upper and lower end portions, and a glass holder 3 for holding and positioning the optical glass relative to the center rod. The upper end portion of the rod 20 is bent to form a an inverted downwardly open hook 21 in U shape and the lower end portion of the rod is bent at right angles to the body to form a stop 36 that extends outwardly from the body. The hook 21 is configured to include a pair of laterally spaced branches 23 and 24 that define a slot or space 22, with the hook being adapted to receive and engage a notch 10 and connect the glass holder grip 2 to the bar by ratcheting the bent end or hook 21 downwardly and into engagement with the notch 10.

As seen in FIG. 1, the glass holder grip 2 (to the left) is connected to the bar 1 and the glass holder grip 2 (to the right) is positioned for downward movement, in the direction of the arrow, for engagement with a notch 10. Further, a notch at the right end of the bar is available for mounting another glass holder grip 2.

Figure 2:
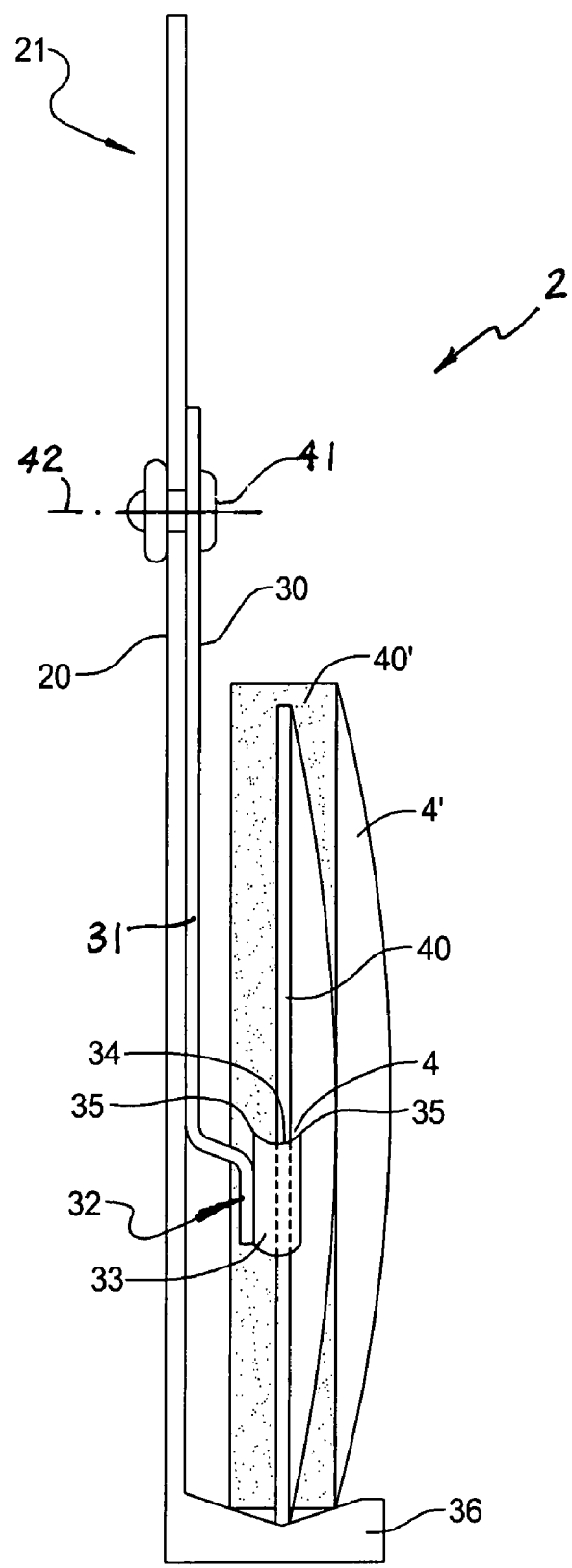
FIG. 2 is a side-view of the glass holder grip carrying an optical glass.

As shown in FIG. 2, the glass holder 3 is configured to enable clutching and tightening about the outer peripheral edge 40, 40' of the optical glass 4, 4'. The glass holder 3 pinches about the peripheral edge to hold the glass and orient the optical glass on the holder grip 2 in a manner to be substantially parallel to the rod axis 20.

According to this invention, the notch 10 includes a bottom 11, which is rectilinear, and the branch 23 of the U-shaped hook 21 includes a notch engaging portion 12 that is rectilinear.

The U-shaped hook 21 is adapted to receive the bar 1 in the space 22 formed between the branches 23, 24. The bar 1 is clutched between a part of the branches 23, 24 of which branch 23 is inserted in the notch 10 and the two rectilinear surfaces 12 and 11, respectively, formed on the branch 23 and the bottom 11 of the notch 10 engage one another to prevent the center rod 20 from turning freely around the bar 1 and from falling, especially during transportation of the support or during the evolution of the support in a sequence of treatments.

As can be seen from the drawings, the depth of space 22 intended to receive bar 1 between the branches 23, 24 is defined by a transverse stop 25 provided in the branch 23, the stop 25 being interiorly of the space 22 and extending towards the opposite branch 24.

Thus, glass holder grips 2 can be easily assembled to or dismounted from the bar 1 by the simple latching of the hook 21 in one of the notches 10, and then it is possible to maintain control over the optical glass 4, 4' without touching it directly with the fingers when dismounting the glass holder grip 2 correspondingly from the frame.

As can be seen in FIG. 2, the glass holder 3 for clutching and maintaining a tight grip about the outer periphery of the optical glass is generally V-shaped and formed by a very thin metal rod 30 that is folded in the middle to form two lever arms 31, 31' and a medially shaped apex. The apex of the V-shaped glass holder 3 is folded in a manner to form a U-shaped recess or cavity sized to fit about and be retained by a rivet 41 secured to the body 20 of the glass holder grip 2, the rivet defining a common swivel axis 42 for the two lever arms 31, 31' of the glass holder 3. The lever arms 31, 31', respectively, terminate in a free end 32, 32' that is provided with a contact piece 33, 33' for engaging the optical glass 4, 4'. The arms 31, 31' are flexibly recalled one towards the other which allows the gripping on the optical glass 4, 4' between the two ends 32, 32' which are free from the arms 31, 31' by the mean of a contact piece 33, 33', as can be seen in FIG. 2.

The contact piece 33, 33' is a metal part in the shape of blade, having at the end and intended to be in contact with the optical glass 4, 4' a curved cut 34, 34' allowing holding optical glasses 4, 4' of various thicknesses.

Curved cuts 34, 34' correspondingly reveal each of the two points 35, 35' making it possible to hold a very thick optical glass 4' by arranging the peripheral edge 40 of the optical glass 4 between the points 35, 35' which in effect, especially after varnish or other liquids application, not to be altered because of the reduced contact surface.

Very thin optical glasses 4' are held by arranging their peripheral edge 40' between the two points 35, 35' corresponding to each cut 34, 34'.

The grips, thus obtained, allow avoiding significant liquid or varnish consumption after soaking in opposition to the current grips. In addition, according to this invention, the glass holder device allows an easy dismantling of the grips while keeping the fixed position of the grips once suspended on the bar of the frame even in case of reversal where the grips and the glasses remain in the position without falling.

The invention claimed is:

1. A glass holder device for the treatment of optical glasses (4, 4') or other substrates and of the kind which includes optical glasses, glass holder grips, an axially elongated bar (1) of cylindrical cross-section for supporting the glass holder grips, and a frame for supporting the bar horizontally, is characterized by said optical glass has a peripheral outer edge (40, 40'), said bar (1) including a series of evenly spaced positioning notches (10) for removably mounting a respective plurality of glass holder grips to the bar and next to one another, said glass holder grip (2) comprising:

an axially elongated body (20) having opposite upper and lower end portions and an axis extending the length of said body, said upper end portion including hanging means (21, 22, 25) for joining the holder grip in a removable way to a respective notch (10) in the bar (1) and locking means (11, 23, 12, 25) for preventing free rotation of the holder grip (2) relative to the bar (1), the upper end portion of the body (20) being bent to form an inverted U-shaped hook (21) that is downwardly open for receiving the bar and, at least in part, adapted to be received in the positioning notch (10) cut in the bar (1), said lower end portion of said body (20) having a support stop (36), the stop projecting perpendicularly outwardly from the body (20) and the outer edge of the optical glass being adapted to be supported on the stop (36) and positioned relative to a holding means (3), and said holding means (3) comprises a V-shaped holder having two lever arms (31, 31') that are joined to one another at a common apex, the apex defining a mountable end and the lever arms extending from the mountable end and terminating in deflectable free ends (32, 32') that are adapted to expand to receive and contract to form a tight clutching gripping engagement with the outer edge of the optical glass (4, 4'), the mountable end being mounted to the upper end portion of the body for relative rotation about a swivel axis (42), the free ends (32, 32') of the lever arms (31, 31') and the stop (36) positioning the optical glass (4, 4') in substantially vertical relation and parallel to the axis of the body (20).

2. The glass holder device according to claim 1, characterized by the lever arms (31, 31') being provided at their free end (32, 32') with a contact piece (33, 33') in the shape of a blade intended to be in contact with the peripheral outer edge (40, 40') of the glass (4, 4'), the blade shaped to include a round and curved cut (34, 34') defined by two points (35, 35').

3. The glass holder device according to claim 1, characterized by a fastener mounted to the body (20), and the V-shaped holder being bent into the V-shape from one-piece and the mountable end thereof being formed by respective end portions of the lever arms (41, 41') being folded in a maimer to form a U shaped chamber sized to connect to the fastener and pin the V-shaped holder to the body (20) for relative rotation thereto.

4. The glass holder device according to claim 2, characterized by a fastener mounted to the body (20), and the V-shaped holder being bent into the V-shape from one-piece and the mountable end thereof being formed by respective end portions of the lever arms (41, 41') being folded in a manner to form a U shaped chamber sized to connect to the fastener and pin the V-shaped holder to the body (20) for relative rotation thereto.

5. A glass holder device for the treatment of optical glasses or other substrates and of the kind which includes glass holder grips, an axially elongated bar of cylindrical cross-section for supporting the glass holder grips, and a frame for supporting the bar horizontally, is characterized by said bar including a series of evenly spaced positioning notches for removably mounting a respective plurality of glass holder grips to the bar and next to one another, said positioning notch having a first rectilinear surface disposed vertically, said glass holder grip comprising an axially elongated body having opposite upper and lower end portions and an axis extending the length of said body, said upper end portion including hanging means for joining the holder grip in a removable way to a respective notch in the bar and locking means for preventing free rotation of the holder grip relative to the bar, said upper end portion of the body being bent to form an inverted U-shaped hook that is downwardly open for receiving the bar and, at least in part, adapted to be received in the positioning notch cut in the bar, said hook including two branches that define therebetween a space sized to receive the bar, the bar being fitted between and clutched by the branches with one of said branches being inserted into the notch and including a second rectilinear surface that engages the first rectilinear surface thereof to prevent the holder grip from turning freely around the bar, and holding means for holding the glass in substantially vertical relation and parallel to the axis of the body.

6. A glass holder device for the treatment of optical glasses (4, 4') or other substrates and of the kind which includes glass holder grips, an axially elongated bar (1) of cylindrical cross-section for supporting the glass holder grips, and a frame for supporting the bar horizontally, is characterized by said bar (1) includes a series of evenly spaced positioning notches (10) for removably mounting a respective plurality of glass holder grips to the bar and next to one another, said glass holder grip (2) comprising:

(a) an axially elongated body (20) having opposite upper and lower end portions and an axis extending the length of said body, said upper end portion including hanging means (21, 22, 25) for joining the holder grip in a removable way to a respective notch (10) in the bar (1), (b) locking means (11, 23, 12, 25) for preventing free rotation of the holder grip (2) relative to the bar (1), (c) holding means (3) for holding the glass (4, 4') in substantially vertical relation and parallel to the axis of the body (20), the upper end portion of the body (20) being bent to form an inverted U-shaped hook (21) that is downwardly open for receiving the bar and, at least in part, adapted to be received in the positioning notch (10) cut in the bar (1), and wherein each positioning notch includes, at least in part, a first rectilinear surface disposed vertically, and the hook (21) includes two branches (23, 24) that define therebetween a space (22) sized to receive the bar (1), the bar being fitted between and clutched by the branches (23, 24) with one of said branches being inserted into the notch (10) and a second rectilinear surface that engages the first rectilinear surface thereof to prevent the holder grip (2) from turning freely around the bar (1).

\* \* \* \* \*